July 9, 1963 W. H. SINK 3,096,663
CLUTCH CONTROL LINKAGE
Filed June 24, 1960
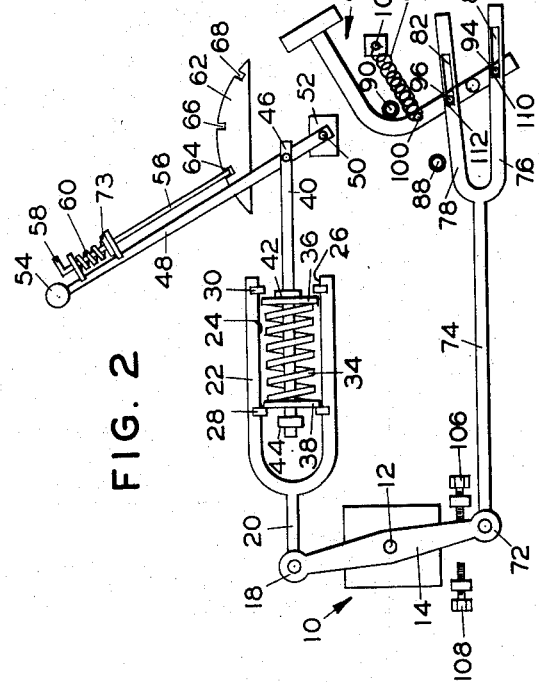
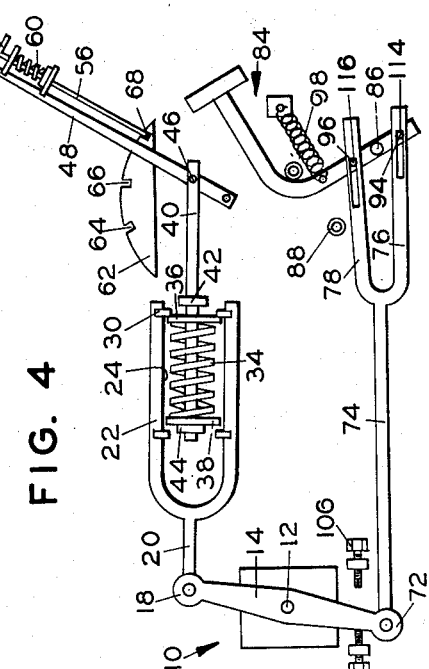
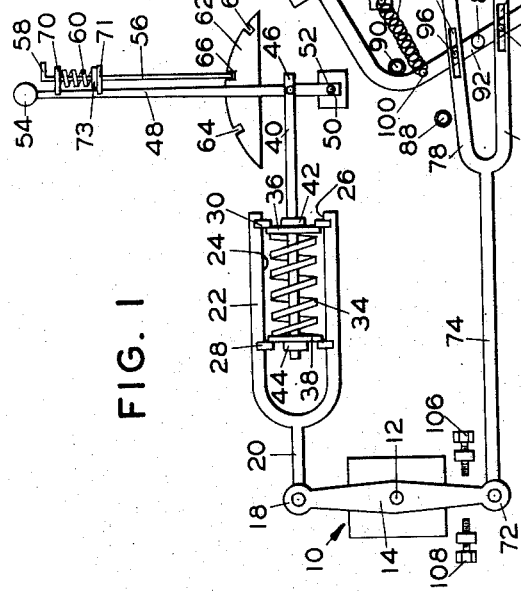
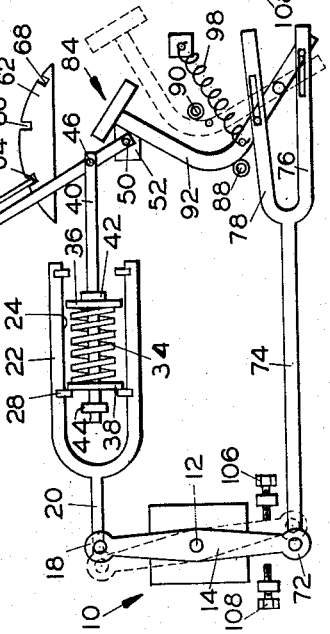
INVENTOR.
WILLIAM H. SINK
BY Walter E. Pawlick
ATTORNEY

United States Patent Office 3,096,663
Patented July 9, 1963

3,096,663
CLUTCH CONTROL LINKAGE
William H. Sink, Toledo, Ohio, assignor to Dana Corporation, Toledo, Ohio, a corporation of Virginia
Filed June 24, 1960, Ser. No. 38,548
17 Claims. (Cl. 74—481)

This invention pertains to controls in general and more specifically to controls for operating a double clutch.

Double clutches have been widely used throughout the industry. This type of clutch provides a relatively simple manner of engaging either of two alternate driven members to one driving member. In this manner two alternate gear trains can be engaged without shifting gears and merely by the engagement of the specific driven member desired. The double clutch has often been used to engage either range of a high and low range transmission. The output of the high or low range can be supplied to a standard shifting transmission. The double clutch also may have a disengaged position and therefore can serve the function of a normal clutch for the standard transmission positioned behind the high-low range. The control for such a double clutch normally has three positions; a central or disengaged position, a forward position where one of the alternate clutches is engaged, a rearward position where the other of the alternate clutches is engaged. Since the clutch has to be moved in two directions from the central disengaged position, a foot pedal actuator is not satisfactory, and the control is normally a hand lever actuator. This presents a problem, for to disengage the clutch the vehicle operator must move the lever by hand. If the double clutch is used with a standard transmission, in order to shift the standard transmission, the operator must first move the hand lever of the clutch to the disengaged position, then shift the standard transmission as desired, and finally re-engage the clutch. This is time consuming and awkward and in addition if the operator wishes to momentarily disengage the clutch he must do so also by hand operation.

It is an object of this invention to provide a control system whereby a foot operated clutch pedal will disengage the double clutch after it has been engaged by another lever.

It is another object of this invention to provide a control system whereby after disengagement of the clutch with the foot pedal the clutch will be automatically re-engaged in its previous position by release of the foot pedal.

It is a further object of this invention to provide such a control system which is simple and inexpensive.

Further and more specific objects and advantages of this invention will be readily apparent from the following description and a consideration of the accompanying illustrations wherein:

FIG. 1 is a diagrammatic elevational view of the control system with the clutch disengaged.

FIG. 2 is a diagrammatic elevational view of the control system with the clutch engaged in one of its alternate positions.

FIG. 3 is a diagrammatic elevational view of the control system when the hand lever has engaged the clutch in one position and the clutch pedal has been depressed to disengage the clutch.

FIG. 4 is a diagrammatic elevational view of the control system with the clutch engaged in its other alternate position.

In one preferred embodiment of this invention the linkage to the clutch pedal is provided with a lost motion means so that it is not able to operate the clutch until the hand operated lever has been actuated to first engage the double clutch in either of its alternate positions. The linkage from the hand lever to the clutch is provided with a compression spring which is of sufficient weight to cause engagement of the clutch when the hand lever is in either of the clutch engaging positions. By depressing the clutch pedal the spring in the clutch lever linkage is compressed and the clutch lever is over-ridden to disengage the clutch. Upon release of the clutch pedal the compression spring reacts to re-engage the clutch.

Referring more particularly to the drawings, FIG. 1 shows a double clutch indicated generally at 10. Control rod 12 extends from the clutch 10 and is mounted therein for reciprocal rotary motion. Fixedly attached to the control rod 12 for rotation therewith is a cross arm 14. A linkage rod 20 is pivotally attached to the upper end 18 of the cross arm 14. The linkage rod 20 terminates in an enlarged hollow cylindrical portion 22 the bore 24 of which is open at its end 26. The cylindrical portion 22 is provided with internal snap ring grooves one near its open end 26 and one contained further within bore 24. Snap ring 28 is fixedly positioned in the former groove and snap ring 30 is fixedly positioned in the latter groove. Confined between the snap rings 28 and 30 is a compression spring 34 which engages washers 36 and 38 at its extremities. The washers 36 and 38 are in abutting engagement with the snap rings 28 and 30 when the clutch is in the disengaged position. A linkage rod 40 passes through washers 36, 38 and spring 34 and has lock nuts 42 and 44 threadedly attached thereto; nut 44 being in abutting engagement with the innermost side of washer 38 and nut 42 in abutting engagement with the outermost side of washer 36 so that the spring 34 serially connects the rods 20 and 40. At its outer end 46, rod 40 is pivotally attached to a clutch lever 48. At its lower end, clutch lever 48 is pivotally attached to a bracket 52 by means of a pin 50 which is fixedly attached to the bracket. The bracket 52 is connected to a portion of the vehicle frame (not shown). The upper end of the clutch lever 48 terminates in a hand operated knob 54.

Parallel to lever 48 is a locking rod 56 which at its upper portion is deformed into an L shaped hand grip portion 58. The lower end of locking rod 56 is adapted for locking engagement with one of the three slots 64, 66, or 68 contained in the upper edge of a bracket 62 which is fixedly attached to a portion of the vehicle frame (not shown). Lever 48 has two stand-off guides 70 and 71 secured thereto which define a pair of guideways. Locking rod 56 is slidably positioned within these guideways and is provided with an enlarged portion 73 which is adapted to engage the lower end of a compression spring 60 disposed around the rod 56. The upper end of the spring 60 is in abutting engagement with the lower portion of stand-off guide 70. Thus, by moving the hand grip portion 58 upwardly and compressing spring 60, the lower end of locking rod 56 is withdrawn from its locking engagement with bracket 62 and lever 58 may be moved to any one of its three locations before hand grip portion 58 is released to lock the rod 56 in the selected slot in bracket 62.

The lower end 72 of cross arm 14 has an end of a second linkage rod 74 pivotally attached thereto. The linkage rod 74 extends substantially parallel to linkage 20 and has its other end divided into branches 76 and 78. Each branch is provided with an elongated slot; branch 76 having a slot 80 and branch 78 having a slot 82.

A foot pedal shown generally at 84 is pivotally attached to a portion of the vehicle frame (not shown) by a pivot pin 86 and also is provided with a lever portion 92 having a pair of spaced abutment pins 94 and 96 thereon. The abutment pins 94 and 96 are adapted for movement in the elongated slots 80 and 82 and are centrally located in the slots when the clutch lever 48 is positioned to disengage the clutch 10. A coil spring 98 is fixedly attached at one of its ends to the lever portion 92 at 100 and at its other end to a pin 102 which is fixedly secured to the vehicle frame. The spring 98 normally urges the foot pedal 84 in a clockwise direction about pivot pin 86 and into engagement with a limit stop 90 extending outwardly from the vehicle frame. Another limit stop 88 is positioned on the other side of foot pedal 84 and limits pivotal movement thereof in the opposite direction.

To effect engagement of the clutch 10, hand grip portion 58 is moved upwardly to remove locking rod 56 from slot 66 and the clutch lever 48 is moved to its forward location as shown in FIG. 2. The hand grip portion 58 is then released and coil spring 60 biases rod 56 into locking engagement with slot 64. This movement of hand lever 48 causes linkage 40 to move to the left carrying washer 36 with the same to compress spring 34. The bias of spring 34 moves washer 38 which reacts against snap ring 28 to urge linkage 20 to the left. As a result, linkage 20 pivots the cross arm 14 in a counterclockwise direction thereby rotating control rod 12 which places double clutch 10 in one of its engaged positions. Counterclockwise rotation of the cross arm 14 is limited by engagement of the same with stop screw 106. It should be noted that the abutment pins 94 and 96 on lever portion 92 of the foot pedal have not interfered with pivotal movement of the cross arm 14 but merely have moved to the left lateral ends 110 and 112 respectively of slots 80 and 82.

To effect disengagement of the clutch 10 when the hand lever 48 is in clutch engaged position, the foot pedal 84 is merely depressed to move foot pedal lever 92 against stop pin 88. This counterclockwise movement of foot pedal lever 92 causes pin 96, which is now positioned in the left end of elongated slot 82, to drive linkage rod 74 to the left. At the same time pin 94 on the foot pedal lever 92 moves to the right end of elongated slot 80 and in doing so does not restrict movement of linkage rod 74. Movement of linkage 74 to the left causes clockwise rotation of cross arm 14 from the phantom line to the full line position shown in FIG. 3 thereby disengaging clutch 10. Linkage 20 does not interfere with the clockwise rotation of the cross arm 14 since movement of linkage 20 to the right merely further compresses spring 34. Thus, while the hand lever 48 is not moved, it is in effect over-ridden by the action of foot pedal 84. Upon release of the foot pedal 84, coil spring 98 biases foot pedal lever 92 in a clockwise direction back against stop pin 90 permitting compression spring 34 to react against linkage 20 to again pivot the cross arm 14 in a counterclockwise direction and re-engage clutch 10.

FIG. 4 illustrates the arrangement of the various parts when hand lever 48 has been moved to its rearward position to engage the clutch 10 for the alternate drive. Rearward movement of the lever 48 moves linkage rod 40 to the right and compresses spring 34 against snap ring 30. This effects movement of linkage rod 20 to the right and clockwise movement of the cross arm 14 to move double clutch 10 to the other of its engaged positions. Clockwise rotation of cross arm 14 is limited by engagement of the cross arm with stop screw 108. This limited rotation of cross member 14 pulls linkage 74 to the left so that abutment pins 94 and 96 on the foot pedal lever 92 are positioned in the right lateral ends 114 and 116 respectively of slots 80 and 82. When the foot pedal 84 is depressed to move the foot pedal lever 92 against stop pin 88, pin 94 moves linkage 74 to the right to cause counterclockwise movement of the cross arm 14 to its vertical position disengaging the clutch 10. During this counterclockwise movement the linkage 20 moves to the left but again merely compresses spring 34 in so doing. Upon release of the foot pedal 84, spring 34 reacts to pivot cross arm 14 in a clockwise direction to return it to its original position re-engaging the clutch 10.

It is now apparent from the foregoing that a double clutch control has been provided which is simple and inexpensive and in which a foot operated pedal will disengage the clutch after it has been engaged by a hand lever, and that after the foot pedal has been released the clutch will automatically be re-engaged.

The preferred embodiment of this invention has been shown and described, but changes and modifications can be made, and it is understood that this description is illustrative only and not for the purpose of rendering this invention limited to the details illustrated or described except insofar as they have been limited by the terms of the following claims.

What I claim:

1. A control device comprising an element having a first position and alternate positions and being adapted to be operated, a linkage operably connected to said element and operable to move the same to its alternate positions, first means movable to a plurality of positions for actuating said linkage, second means operably connected to said element and adapted to operate the same, said second means including a lost motion device so that said second means becomes operative to move said element only after said linkage has moved said element to an alternate position, and resilient means serially incorporated in said linkage so that said second means can over-ride said first means.

2. A control device comprising an element having a first position and alternate positions and being adapted to be operated, a first linkage operably connected to said element and operative to move the same to its alternate positions, first means actuating said first linkage, a second linkage operably connected to said element, second means for operating said second linkage, lost motion means incorporated in said second linkage so that said second linkage becomes operable to move said element only after said first linkage has been actuated and has moved said element to an alternate position, and resilient means serially incorporated in said first linkage so that said second means can over-ride said first means.

3. A control device comprising an element having a first position and alternate positions and being adapted to be operated, a first linkage operably connected to said element and operative to move the same to its alternate positions, a first lever movable to a plurality of positions for actuating said first linkage, a second linkage operably connected to said element, a second lever for operating said second linkage, lost motion means incorporated in said second linkage so that said second linkage becomes operable to move said element to its first position only after said first linkage has been actuated and has moved said element to an alternate position, and resilient means serially incorporated in said first linkage so that said second lever can over-ride said first lever.

4. A control device comprising an element having activated and deactivated positions and being adapted to be operated, a first linkage operably connected to said element and operative to move the same to, a first lever for actuating said first linkage, a second linkage operably connected to the element, a second lever for operating said second linkage, lost motion means incorporated in said second linkage so that said second lever becomes operative to move said element to its deactivated position only after said first linkage has been actuated to move said element to its activated position, and resilient means serially incorporated in said first linkage so that said second lever can de-activate the element after it has been activated by the first lever, said resilient means reactivating said element upon release of said second lever.

5. A control device for operating an element having a neutral position comprising a hand lever having a neutral position and being operatively connected to said element, said hand lever being movable in one direction from its neutral position to move said element to one position from its neutral position and being movable in another direction from its neutral position to move said element to another position from its neutral position, and foot pedal means operatively connected to said element and movable between a normal and a depressed position, depression of said foot pedal means causing movement of said element to its neutral position only after said element has been moved from its neutral position.

6. The combination of claim 5 wherein said element returns to its former position upon return of the foot pedal means to said normal position.

7. A control device for operating an element having a neutral position and alternate positions comprising, a primary linkage operably connected to the element, a first lever for actuating said primary linkage and being movable to a plurality of positions to move said element to its alternate positions and its neutral position, a secondary linkage operably connected to said element, a second lever for operating said secondary linkage, lost motion means incorporated in said secondary linkage so that said secondary linkage becomes operative only after said primary linkage has moved said element to one of its alternate positions, and resilient means incorporated in said primary linkage so that said second lever is operable to return the element to its neutral position after it has been moved to an alternate position by said first lever, said resilient means returning said element to its former position upon release of said second lever.

8. A clutch control for operating an element having a neutral position and alternate positions comprising, a primary linkage operatively connected to said element, a hand lever having a neutral position, said hand lever operatively connected to said primary linkage and being movable in one direction from its neutral position to move said element to one of its alternate positions and being movable in another direction from its neutral position to move said element to another of its alternate positions, a secondary linkage also operatively connected to said element, and foot pedal means operatively connected to said second linkage, said operative connection between said foot pedal means, said secondary linkage and said element including lost motion means so that said foot pedal means only becomes operative after said primary linkage has moved said element to one of its alternate positions, and resilient means incorporated in said primary linkage so that said foot pedal means is operative to move said element to its neutral position after it has been first moved to one of its alternate positions by said hand lever.

9. A control device for operating an element having a neutral position and alternate positions comprising, a first movable means operatively connected to said element and having a neutral position, said first means being movable from its neutral position to move said element to alternate positions, and second means operatively connected to said elements, said second means being operative to return said element to its neutral position only after said element has been moved to one of its alternate positions.

10. A control device for operating an element having a neutral position and alternate positions comprising, in combination, first linkage means having a neutral position and being operatively connected to said element, said first linkage being movable in one direction from its neutral position to move said element to one alternate position and being movable in another direction from its neutral position to move said element to another alternate position, and a second linkage means operatively connected to said element and movable between a normal and displaced position, displacement of said second linkage means after said element has been moved to an alternate position causing return of said element to its neutral position, and return of said second linkage to its normal position allowing said element to return to its former alternate position.

11. A control device for operating an element having a neutral position and alternate positions comprising first linkage means having a neutral position and being operatively connected to said element, said first linkage being movable in one direction from its neutral position to move said element to one alternate position and being movable in another direction from its neutral position to move said element to another alternate position, a second linkage means operatively associated with said element and movable between a normal and displaced position, and a lost motion device incorporated in said second linkage means, said second linkage means being operatively connected to said element only after said element has been displaced to an alternate position, movement of said second linkage means to its displaced position causing return of said element to its neutral position and movement of said second linkage means to its normal position allowing said element to return to its former alternate position.

12. A control device for operating an element having a first position and alternate positions comprising a first movable means operatively connected to said element and being movable to alternate positions to move said element to its first and alternate positions, and second means operatively connected to said element and being operative to return said element to its first position only after said element has been moved to any one of its alternate positions.

13. A control device for operating an element having a first position and alternate positions comprising a first operable means having a first position and alternate positions and being operatively connected to said element, said first operable means being movable to one of its alternate positions to move said element to an alternate position and being movable to another of its alternate positions to move said element to another alternate position, and second operable means operatively connected to said element and movable between a normal and displaced position, displacement of said second operable means causing movement of said element to its first position only after said element has been moved from its first position.

14. The combination of claim 13 wherein return of said second operable means to its normal position allows said element to return to its former alternate position.

15. The combination of claim 13 wherein said first operable means returns said element from its first position to its former alternate position upon return of said second operable means to its normal position.

16. A control device for operating an element having a first position and alternate positions comprising a first movable means operatively connected to said element and including a resilient means, said first movable means being movable to alternate positions to move said element to its first and alternate positions, and second means having a normal and displaced position operatively connected to said element and including a lost motion means, said second means being operative upon movement to its displaced position to return said element to its first position by reacting against said resilient means only after said first means has moved said element to an alternate position, and return of said second means to its normal position allowing said resilient means to move said element to its former position.

17. A control device for operating an element having a neutral position and alternate positions comprising a first linkage means operatively connected to said element, a resilient means serially disposed in said first linkage means, said first linkage means having a neutral position and being movable in one direction from its neutral position to move said element to one alternate position and being movable in another direction from its neutral position to move said element to another alternate position, said resilient means being subjected to a load upon said first linkage means moving said element, a second linkage means operatively associated with said element and movable between a normal and displaced position and a lost motion device incorporated in said second linkage means, said second linkage means being operatively connected to said element only after said element has been moved to an alternate position, movement of said second linkage means to its displaced position causing return of said element to its neutral position and further loading of said resilient means and movement of said second linkage means to its normal position allowing said resilient means to bias said element to its former alternate position.

References Cited in the file of this patent

UNITED STATES PATENTS

| | | |
|---|---|---|
| 902,856 | Cave | Nov. 3, 1908 |
| 974,649 | Fishburne et al. | Nov. 1, 1910 |
| 1,016,052 | Webb | Jan. 30, 1912 |
| 1,095,056 | Winton et al. | Apr. 28, 1914 |
| 2,040,711 | Riley | May 12, 1936 |
| 2,821,091 | Benner | Jan. 28, 1958 |
| 2,945,570 | Ferguson et al. | July 19, 1960 |